US006799363B1

(12) United States Patent
Dickinson (10) Patent No.: US 6,799,363 B1
(45) Date of Patent: Oct. 5, 2004

(54) SYSTEM FOR MANUFACTURE AND USE OF A SUPERCONDUCTIVE COIL

(76) Inventor: Charles Bayne Dickinson, 224 N. Beach Blvd., Bay St. Louis, MS (US) 39520

( * ) Notice: Subject to any disclaimer, the term of this patent is extended or adjusted under 35 U.S.C. 154(b) by 0 days.

(21) Appl. No.: 10/610,237

(22) Filed: Jun. 30, 2003

Related U.S. Application Data (63) Continuation of application No. PCT/US02/38658, filed on Dec. 4, 2002, and a continuation-in-part of application No. 09/872,574, filed on Jun. 1, 2001, now Pat. No. 6,617,738.

(51) Int. Cl.[7] .............................................. H01L 39/24
(52) U.S. Cl. ......................... 29/599; 505/211; 505/230; 505/430; 335/216
(58) Field of Search .......................... 29/599; 505/211, 505/230, 430; 335/216

(56) References Cited

U.S. PATENT DOCUMENTS

| | | | |
|---|---|---|---|
| 1,061,206 A | 5/1913 | Tesla | |
| 3,333,331 A | 8/1967 | Swartz | 29/599 |
| 3,443,134 A | 5/1969 | Dowsett et al. | 310/178 |
| 3,539,852 A | 11/1970 | Appleton et al. | 310/178 |
| 4,135,294 A | 1/1979 | Brown | 29/605 |
| 4,740,711 A | 4/1988 | Sato et al. | 249/52 |
| 4,965,247 A | 10/1990 | Nishiguchi | 505/1 |
| 5,166,130 A | 11/1992 | Enomoto et al. | 505/1 |
| 5,173,678 A | 12/1992 | Bellows et al. | 335/216 |
| 5,225,394 A | 7/1993 | Yamazaki | 505/1 |
| 5,248,657 A | 9/1993 | Bailey et al. | 505/1 |
| 5,308,799 A | 5/1994 | Morita et al. | 505/126 |
| 5,426,408 A | 6/1995 | Jones et al. | 505/211 |
| 5,482,919 A | 1/1996 | Joshi | 310/52 |
| 5,506,198 A | 4/1996 | Sato | 505/211 |
| 5,719,106 A | 2/1998 | Mukai et al. | 505/430 |
| 5,789,347 A | 8/1998 | Button et al. | 505/450 |
| 5,798,312 A | 8/1998 | Okada et al. | 505/230 |
| 5,902,774 A | 5/1999 | Muranaka et al. | 505/433 |
| 6,010,983 A | 1/2000 | Topchiashvili et al. | 505/500 |
| 6,239,079 B1 | 5/2001 | Topchiashvili et al. | 505/124 |
| 6,375,412 B1 | 4/2002 | Dial | 415/90 |
| 6,617,738 B2 * | 9/2003 | Dickinson | 310/178 |

FOREIGN PATENT DOCUMENTS

| | | | | |
|---|---|---|---|---|
| EP | 0653829 A1 | 5/1995 | | 310/178 |
| JP | 04161056 | 6/1992 | | H02K/55/00 |

OTHER PUBLICATIONS

Paul Sharke; "Little big el–mo"; The American Society of Mechanical Engineers; 2001; 8 pages.

(List continued on next page.)

*Primary Examiner*—David P. Bryant
(74) *Attorney, Agent, or Firm*—E. Eugene Thigpen (57) ABSTRACT

In one embodiment, the invention comprises a system for manufacturing a superconductive electrical conductor. A channel (140) is formed in a mold (130) that is formed from a ceramic material having a negative heat coefficient of expansion. A material (142) having a positive heat coefficient of expansion that develops superconductivity characteristics upon the application of heat is deposited in the channel. Heat is applied to the mold (130) with the material (142) that develops superconductivity characteristics deposited in the channel to develop the superconductivity characteristics in the deposited material. In a particular embodiment, the negative heat coefficient of expansion and said positive heat coefficient of expansion are complementary, such that change with heat in dimensions of the channel (140) formed in the mold (130) and change with heat in dimensions of the material (142) deposited in the channel (140) are substantially the same. In a more particular embodiment the channel forms a coil (22).

30 Claims, 10 Drawing Sheets

OTHER PUBLICATIONS

Jeremy Smith; "Weird 'Heat Shrinking' Material May Prove Blessing"; Reuters; Sep. 25, 2002; 2 pages.

Steve Eisenberg and Gary Dorsey; "When the heat's on, material shrinks instead of expanding"; Lucent Technologies; Nov. 11, 1998; 2 pages.

"Applying the principle of 'linear thermal expansion and contraction'"; Applied Innovation Alliance, LLC; 2002; 2 pages.

Nancy K. McGurie; "Composites of Opposites"; Today's Chemist At Work; American Chemical Society; Nov. 2002; p. 24–28.

Bruce Schechter; "High–temperature superconductors start finding real–world uses"; Scientific American; Aug. 20, 2000; 2 pages.

S. Dierks; "Material Safety Data Sheet"; Electronic Space Products International; Oct. 2002; 1050 Benson Way, Ashland, Oregon; 3 pages.

Joe Minervini and Bob Woolley and Joel Schultz and Phil Heitzenroeder and Nicolai Martovetsky and Dick Thome; "Magnets"; Snowmass 1999 Fusion Summer Study Technology Issues Working Group; UCLA; 1999; 5 pages.

\* cited by examiner

Faraday disk
*FIG 4*

SYSTEM FOR MANUFACTURE AND USE OF A SUPERCONDUCTIVE COIL

CROSS-REFERENCE TO RELATED APPLICATIONS

This application is a continuation application of PCT Patent Application PCT/US02/38658, filed on Dec. 4, 2002 in the United States Receiving Office, from which priority is claimed under 35 USC § 365(a)–(c). This application is also a continuation-in-part application of U.S. Nonprovisional patent application Ser. No. 09/872,574, filed on Jun. 1, 2001, now U.S. Pat. No. 6,617,738, granted Sep. 9, 2003, from which priority is claimed under 35 USC § 120.

PCT Patent Application PCT/US02/16259, filed on May 24, 2002 in the United States Receiving Office, is based on U.S. Nonprovisional patent application Ser. No. 09/872,574, now U.S. Pat. No. 6,617,738, granted Sep. 9, 2003. No priority is claimed under PCT Patent Application PCT/US02/16259.

STATEMENT REGARDING FEDERALLY SPONSORED RESEARCH OR DEVELOPMENT

Not applicable

BACKGROUND OF THE INVENTION

Typically, in electrical power plants in operation today, the prime mover for the generator is a mechanical turbine. The source of power for the turbine is normally either falling water obtained from lakes formed by damming rivers, or steam, obtained by turning liquid water into a gas (steam) by the addition of heat which may be obtained from the combustion of fossil fuels or nuclear reactions. Use of other sources of electrical energy, such as batteries, fuel cells, solar cells, and wind powered generators, is normally less economical than the use of turbine generators.

The underlying theory and equations which allowed others to build machines to convert other forms of energy into electrical energy were developed by James Maxwell and Michael Faraday. In the conversion of heat energy into electrical energy, the latent energy in fossil fuels is first converted into heat energy through the combustion process. This heat energy is then added to a working fluid (water) to increase its potential energy. This heat energy is then converted into mechanical energy by rotating a turbine, which includes electrically conducting coils, in a magnetic field. The fundamental principle utilized in producing electrical energy is that when an electrical conductor (wire) is moved through a magnetic field, an electrical current will flow through the conductor. By connecting this conductor to an external device the electrical current is made to move through the external device, such as an electrical motor, designed to produce a useful effect, and return to the generator.

Massive distribution systems are now required to transport electricity from the generator to the user. The costs associated with developing electrical power distribution systems are extremely high. Moreover, these distributions systems are fragile and need constant maintenance and repair, and power distribution is constantly threatened by climatic disruptions and sabotage.

There is a long felt need for a system for generating electrical power which is non-polluting. There is also a long felt need for a system for generating electrical power which does not require a massive distribution system of electrically conducting wires. There is also a long felt need for improvement in manufacturing processes for high temperature superconductive materials for application to many technical fields.

It should be noted that the description of the invention which follows should not be construed as limiting the invention to the examples and preferred embodiments shown and described. Those skilled in the art to which this invention pertains will be able to devise variations of this invention within the scope of the appended claims.

SUMMARY OF THE INVENTION

In one embodiment, the invention comprises a system for manufacturing a superconductive electrical conductor. A channel is formed in a mold that is formed from a ceramic material having a negative heat coefficient of expansion. A material having a positive heat coefficient of expansion that develops superconductivity characteristics upon the application of heat is deposited in the channel. Heat is applied to the mold with the material that develops superconductivity characteristics deposited in the channel to develop the superconductivity characteristics in the deposited material. In a particular embodiment, the negative heat coefficient of expansion and said positive heat coefficient of expansion are complementary, such that change with heat in dimensions of the channel formed in the mold and change with heat in dimensions of the material deposited in the channel are substantially the same. In a more particular embodiment the channel forms a coil.

In yet another embodiment, the invention comprises a system for initiating superconductive current flow in a coil formed from material that is superconductive below a certain temperature. The coil is immersed in a cryogenic fluid to cool the coil below its superconductive temperature. Heat is applied to a first segment of the coil to maintain the first segment above a superconductive temperature. A current flow is established in a second segment of the coil from a source of electric current. After the second segment becomes superconductive, the application of heat to said first segment is discontinued, thereby allowing the first segment to cool below the superconductive material and establishing superconductive current flow within the first and second segment of the coil.

DESCRIPTION OF PREFERRED EMBODIMENT

Figure 1:
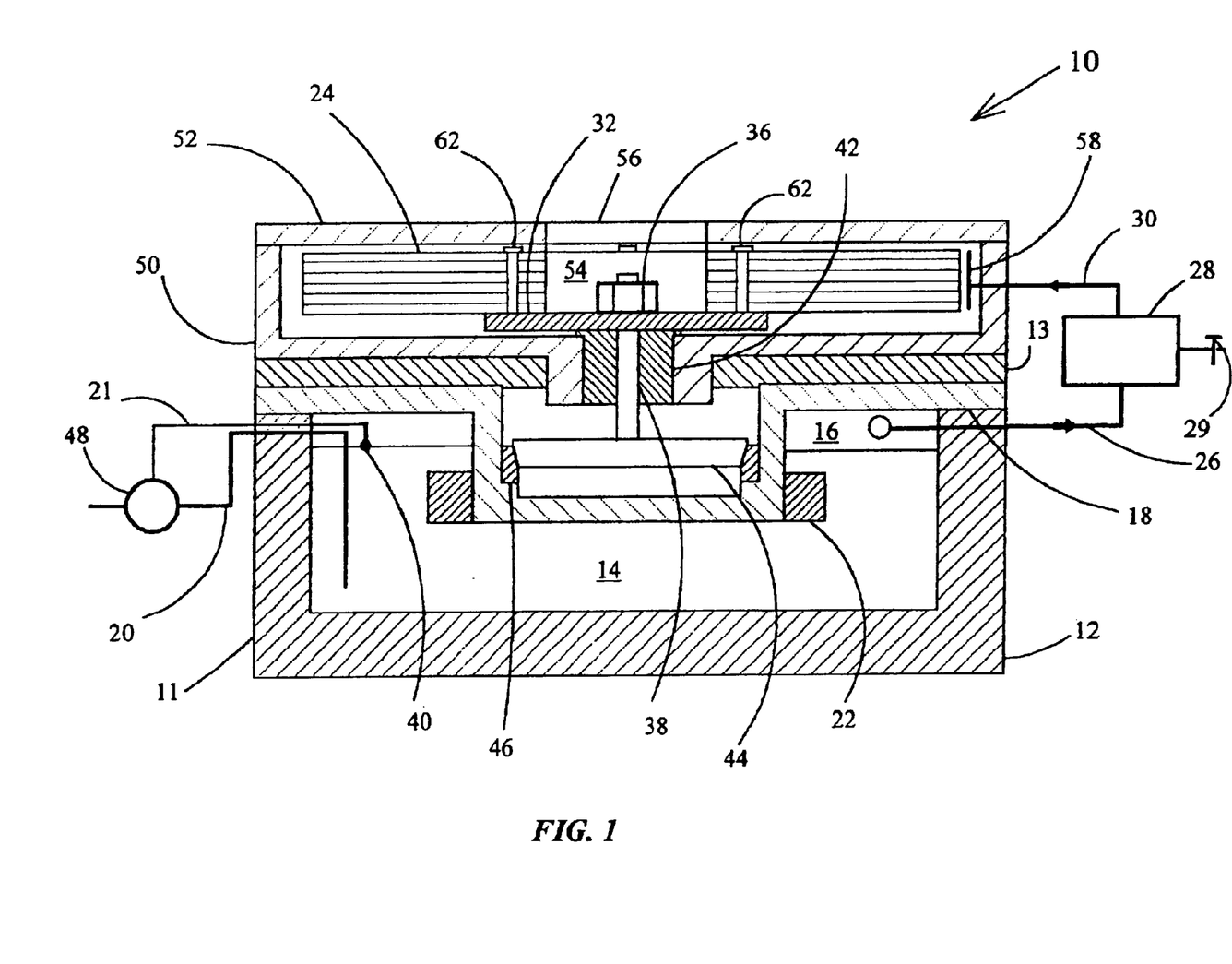
FIG. 1 shows a diagram in partial cross-section of a generator in accordance with a preferred embodiment of the invention.

FIG. 1 shows a diagram of an electrical power generator 10 in accordance with a preferred embodiment of the invention. In a preferred embodiment of the invention, power for the prime mover is derived from the conversion of a cryogenic fluid from a liquid to a gas under pressure. The term "cryogenic fluid" is intended to mean a substance which is gaseous at temperatures typically found at the earth's surface, but which may be liquified at lower temperatures. Although nitrogen may be a more practical cryogenic fluid for implementing the invention, those of ordinary skill in the art will understand that other gases which qualify at low temperatures, such as hydrogen or helium, may be utilized in implementing the invention.

Seventy-eight percent of the earth's atmosphere is gaseous nitrogen. Therefore, nitrogen is available at any point on the earth in unlimited amounts. Nitrogen becomes a liquid at about minus 321 degrees Fahrenheit (–321° F.), which is about seventy seven degrees Kelvin (77° K.). When heat is added to liquid nitrogen to convert it into a gas, the volume of the nitrogen expands by a factor of about 850/1; that is, a one cubic inch volume of liquid nitrogen becomes about 850 cubic inches of gaseous nitrogen at 77° K. If heat is then added to this one (1) cubic inch volume and the temperature is increased from 77° K. to an ambient temperature of 288° K., the pressure of the nitrogen will be about 80 pounds per square inch gage (psig). Accordingly, the thermal energy which is added to the nitrogen may be released to produce a mechanical motion. In accordance with a preferred embodiment of the present invention this produced mechanical motion is utilized to produce electrical power.

In one embodiment of the invention, yttrium barium copper oxide is used as the superconducting material. However, other superconducting material, including but not limited to thallium barium calcium copper oxide and bismuth strontium calcium copper oxide, may be utilized so long as the temperature at which the material becomes superconductive is higher than the temperature at which the cryogenic fluid becomes liquid.

The liquid nitrogen 14 is contained in cryogenic container 12 and superconducting coil 22 is immersed in the liquid nitrogen. As heat is absorbed by the liquid nitrogen, the liquid nitrogen initially boils off as gaseous nitrogen 16, which collects at the top of cryogenic container 12. When the pressure of the gaseous nitrogen increases to a selected level, it will activate pressure regulator 28, which permits gaseous nitrogen to flow, under pressure, through conduit 26 and 30 and nozzles 58, to the prime mover 24.

Figure 2A:
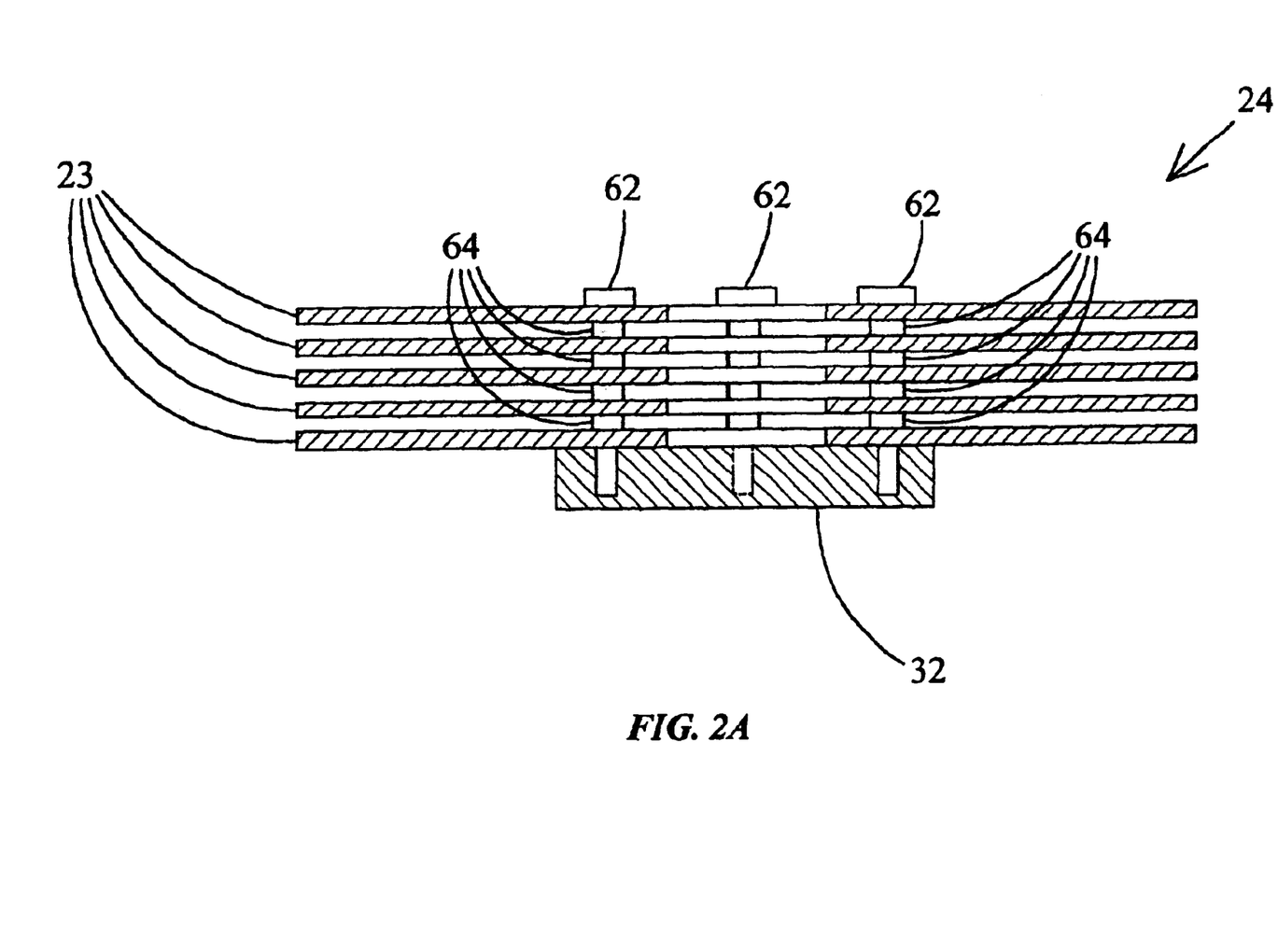
FIG. 2A shows a cross-sectional side view of a prime mover comprising a plurality of spaced-apart disks.
Figure 2B:
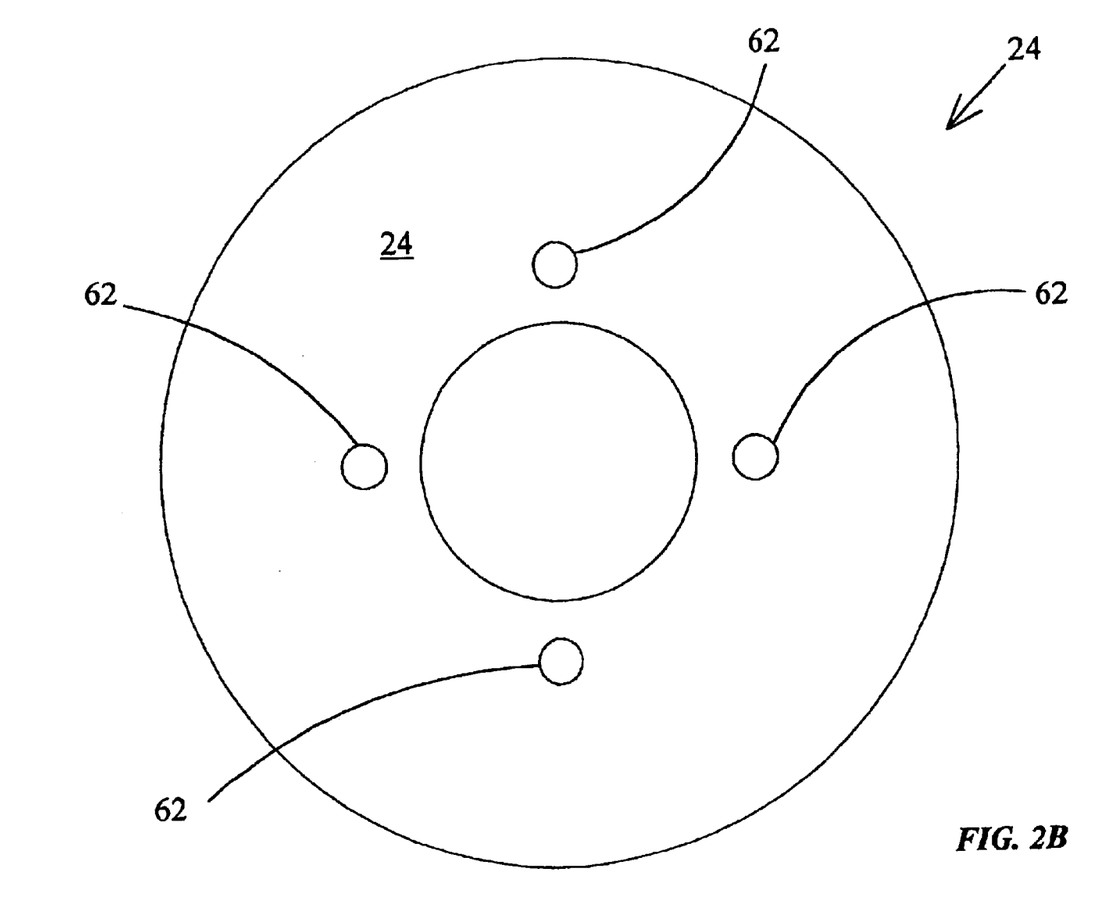
FIG. 2B shows a top view of a prime mover comprising a plurality of spaced-apart disks.

As shown in FIGS. 2A and 2B, in a preferred embodiment, prime mover 24 is a turbine comprising a plurality of disks, mounted closely together in substantially parallel planes. The gaseous nitrogen flows between these disks and induces rotational motion of the prime mover. Prime mover 24 is mounted on disk element 32, which is mechanically coupled to Faraday disk 44 through shaft 38, through which rotational motion of the prime mover 24 is coupled to Faraday disk 44. Faraday disk 44, which may be formed from copper or other highly conductive material, rotates within the magnetic field developed by electrical current circulating in coil 22. As a result of the rotation of the Faraday disk through the magnetic field, a voltage is generated between the center and the outer edge of the Faraday disk. As described further below, current flows from the Faraday disk to a user of electrical energy and back to the Faraday disk through electrical conductors applied to the center and outer edge of the Faraday disk.

Liquid nitrogen, denoted by numeral 14, is contained within cryogenic container 12, which may comprise a conventional Dewar type vessel 11 and cryogenic barrier 18, which forms the top of cryogenic container 12. Dewar type vessel 11 may be a conventional double walled container with a vacuum or a low thermal conductivity material between the walls. Note that FIG. 1 is drawn for the purpose of illustrating the invention and is not intended to be a scale drawing. Cryogenic barrier 18, which forms the top of the cryogenic container 12 would typically be much smaller in relation to vessel 11 than is shown is FIG. 1. Container 12 is configured for maintaining superconductive coil 22 submerged in the liquid nitrogen. The container 12 must be sealed and of sufficient mechanical strength to withstand the pressure build-up of the gaseous nitrogen as the liquid nitrogen boils off.

FIG. 1 shows conduit 20, through which liquid nitrogen may be added to cryogenic container 12 from an external source (not shown) of liquid nitrogen Conduit 20 may be conventional cryogenic tubing known to those of ordinary skill in the art. Also shown is level sensor 40 and the cryogenic valve 48 that level sensor 40 controls. When level sensor 40 detects that the level of the liquid nitrogen has fallen below a selected level, level sensor 40 opens cryogenic valve 48 to allow additional liquid nitrogen to flow into cryogenic container 12 from the external liquid nitrogen source. This level is selected to keep the superconductive coil 22 submerged in the liquid nitrogen in order to maintain the superconductivity of the coil. Level sensor 40 is operatively connected to cryogenic valve 48, typically through an electrically conducting wire 21.

In a preferred embodiment, power is generated by rotating a Faraday disk 44 in a magnetic field resulting from current flow through coil 22. Power for rotating the Faraday disk is generated by the absorption of heat by the liquid nitrogen, which converts a portion of the liquid nitrogen 14 into gaseous nitrogen. Although cryogenic barrier 18 will have low thermal conductivity, the material forming cryogenic barrier 18 is chosen to conduct a limited amount of heat into the liquid nitrogen chamber for converting the liquid nitrogen to a gas at a controlled rate. Because the nitrogen is confined in cryogenic container 12, pressure will increase in this space as the liquid is converted to a gas. The gaseous nitrogen is held in the cryogenic container until a desired operating pressure is reached. Pressure regulator 28 is set to open at the desired operating pressure so that the gaseous nitrogen flows from conduit 26 to conduit 30 and then through nozzles 58. As the gaseous nitrogen is propelled through the nozzles 58 it reaches a very high velocity (typically 330 meters per second at about 15 psig, or greater at higher pressures). This high velocity gas now flows through the prime mover 24 and into the center space 54 within the prune mover, and then out to the atmosphere through exhaust conduit 56. As discussed below, the gaseous flow through prime mover 24 causes rotational motion of the prime mover. This rotational motion is then transferred through shaft 38 to Faraday disk 44.

As shown in FIG. 1, safety valve 29 may be included in the gaseous nitrogen flow path so that if for any reason the pressure within cryogenic container 12 exceeds a selected maximum pressure, safety valve 29 will open and release gaseous nitrogen into the atmosphere.

The electrical energy output of the generator 10 is proportional to the intensity of the magnetic field produced by superconducting coil 22, which is proportional to the current flow in the coil 22. Because the current flow that can be generated in a superconducting coil is much greater than the current flow that can be generated in a conventional wire, a much more powerful magnetic field can be produced by a superconducting coil than by conventional wire. A particularly advantageous feature of superconducting coils is their ability to sustain an electrical current in the coil without additional electrical input as long as the coil is below the critical temperature of the superconductive material from which the coil is made. Therefore, once the electrical current has started to flow in the coil, the input connections to the coil can be "shorted" together and, provided the temperature of the coil is maintained below its critical (superconducting) temperature, the current will continue to flow in the coil for very long periods of time. Because of the availability of liquid nitrogen, a high temperature superconducting coil is especially useful for producing the magnetic field in the generator portion of the machine.

An advantageous mechanical feature of a preferred embodiment of the invention is that the liquid nitrogen which is utilized for maintaining the magnetic field producing coil at a superconducting temperature may also be utilized for developing the mechanical energy for operating the generator. Although a preferred embodiment of the invention is described in terms of using the evaporating cryogenic fluid from cryogenic container 12 for driving the prime mover 24, those of ordinary skill in the art will understand that the gaseous stream which drives the prime mover may be obtained from a source other than the container in which the cryogenic fluid is stored for maintaining the superconductive coil 22 at a superconducting temperature. For example, the source of the gaseous stream could be another container of evaporating cryogenic fluid.

A conductive coil, which may be made from a high temperature superconductive material, such as yttrium barium copper oxide (YBCO), is preferably immersed within liquid nitrogen. Accordingly, superconductive coil 22 is shown mounted on a portion of cryogenic barrier 18 which extends downwardly into the cryogenic container 12, so that in normal operation, coil 22 will be immersed in the liquid nitrogen, or other cryogenic fluid. Typically, the upper portion of cryogenic container 12 will contain gaseous nitrogen, which is designated by numeral 16 in FIG. 1. The superconductive coil may be cemented to the cryogenic barrier 18 as shown, but it can be fastened within cryogenic container 12 in any container that will maintain the coil 22 in a stable position relative to Faraday disk 44. Those of ordinary skill in the art will understand that the mechanism used for holding coil 22 in place must be able to withstand the temperature of the liquid nitrogen, or other cryogenic fluid utilized.

Figure 3A:
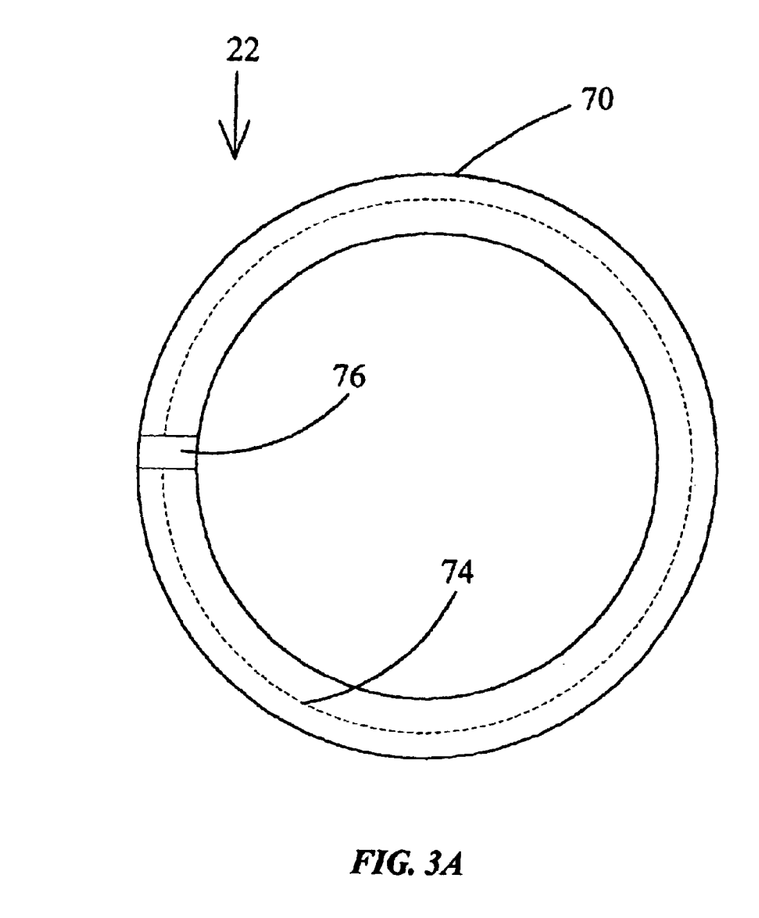
FIG. 3A shows a top view of an implementation of a superconductive coil.
Figure 3B:
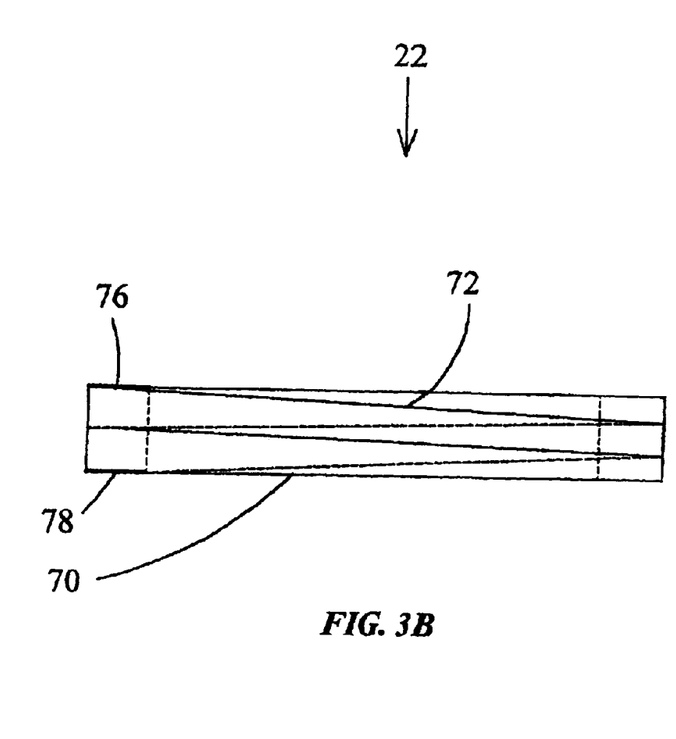
FIG. 3B shows a side view of an implementation of a superconductive coil.
Figure 3C:
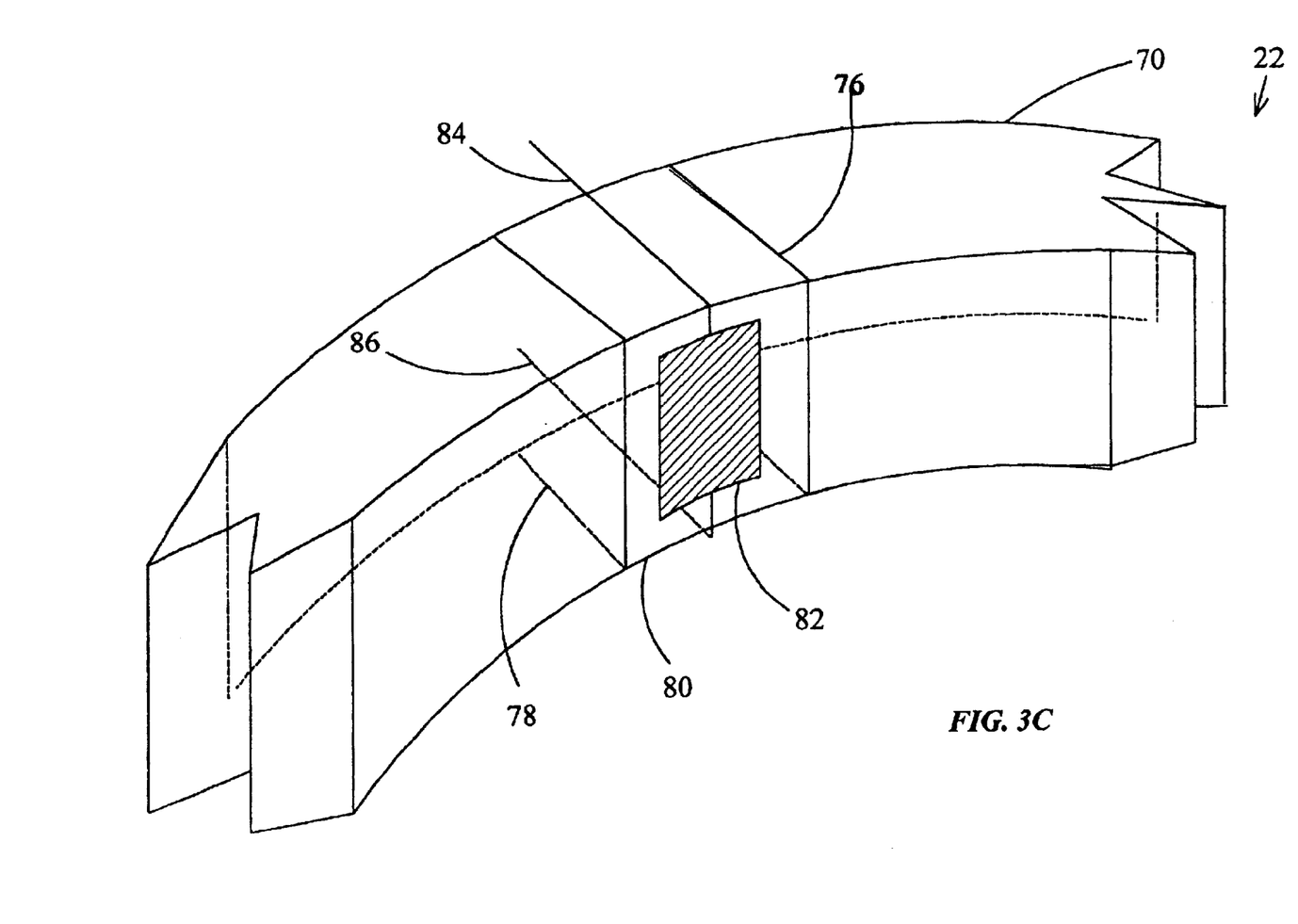
FIG. 3C is a perspective view of a segment of the superconductive coil.

The construction of a first implementation of the coil 22 is shown in FIGS. 3A, 3B and 3C. Because of the difficulty in forming a wire from yttrium barium copper oxide (YBCO) and other superconductive material, the coil may be formed within a mold comprising ceramic loop 70, as shown in FIGS. 3A and 3B. Spiral groove 72 may be cut into ceramic form 70, which may extend to a depth location 74 within the ceramic loop. This spiral groove is shown reaching the top surface of ceramic loop 70 at location 76, and reaching the bottom of ceramic loop 70 at location 78. The superconducting coil is formed by filling the spiral groove 72 with the superconductive material. In order to connect the upper end of the spiral loop at location 76 to the lower end of the spiral loop at location 78, a connective groove 80 may be formed in the ceramic form 70 extending from location 76, down the interior side of ceramic form 70, to location 78, as shown in FIG. 3C. By filling this connective groove 80 with the superconductive material, the upper end 76 and the lower end 78 of the spiral loop are joined together to form a superconductive coil.

Also shown in FIG. 3C is a small resistance heater 82 mounted in juxtaposition to connective link 80. As explained below, to initiate operation of the system, a battery (not shown) is connected between terminal 84, which is electrically connected to location 76 and one end of resistance heater 82, and terminal 86, which is electrically connected to location 78 and the other end of resistance heater 82.

Figure 7A:
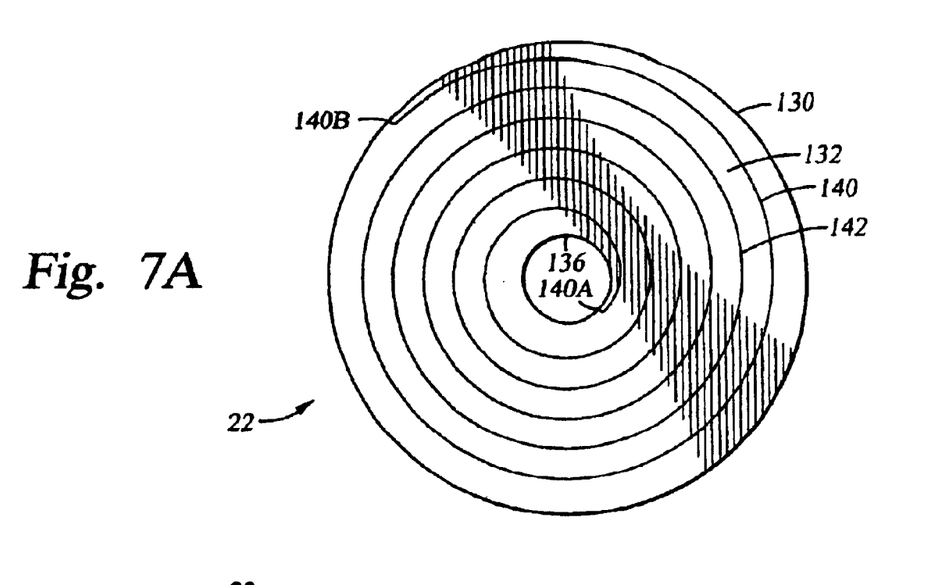
FIGS. 7A, 7B and 7C show an embodiment of a superconductive coil.
Figure 7B:
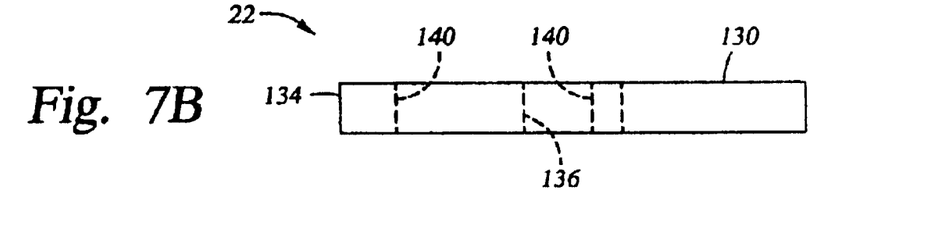
Figure 7C:
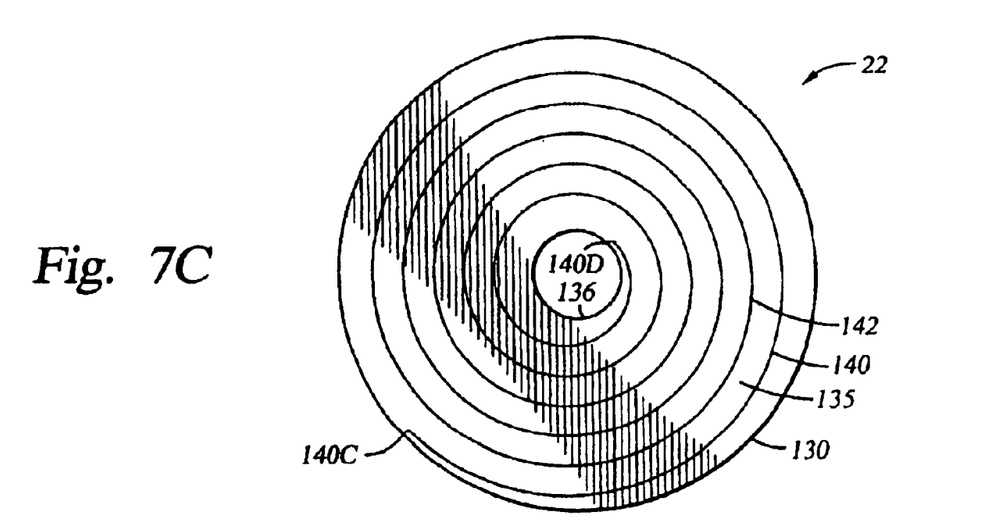

The construction of another implementation of the coil 22 is shown in FIGS. 7A, 7B and 7C. FIGS. 7A, 7B and 7C show a ceramic form 130 (also referred to herein as a mold), which may be a disk, into which a superconductive coil is constructed according to an embodiment of the present invention. FIG. 7A shows a first surface 132 of the disk, which may be referred to herein as the top surface. FIG. 7B shows a side view and FIG. 7C shows a second surface 135 of the disk, which may be referred to herein as the bottom surface. A circumferential surface 134 extends from the first surface to the second surface, as shown in FIG. 7B. As also indicated in FIGS. 7A, 7B and 7C, an aperture 136 extends through the interior of the disk, with an inner surface of the aperture extending from the first surface 132 to the second surface 135. Although a preferred embodiment is described in terms of a disk, the invention may comprise other forms having a first surface and a second surface, which preferably are substantially parallel, with a circumferential surface (or edge) and an internal aperture surface extending between the first and second surfaces.

Grooves 140 are preferably cast into ceramic form 130 when the ceramic form is manufactured. Alternatively, the grooves 140 may be milled, or otherwise formed, into the form 130 after it is manufactured. In either event, the grooves 140 are formed in a continuous pattern on the first surface 132 and second surface 135 extending substantially from the internal aperture 136 to the outer circumference (outer edge), preferably in a generally spiral pattern. On a first (or top) surface 132 of the disk, the spiral goes in a first direction, which may be a clockwise (rightward) projection, extending from location 140B at substantially the outside edge (the outer circumference) of the surface to location 140A at the internal aperture 136 of the disk. On the second (or bottom) surface 135 of the disk as shown in FIG. 7C, the spirals are in the reverse direction, which may be a counterclockwise (or leftward) orientation, and extend from location 140C at substantially the outside edge (the outer circumference) to location 140D at the internal aperture 136 of disk 130. The purpose of the leftward orientation on the second (bottom) surface and the rightward orientation on the first (top) surface is to facilitate the assembly of a continuous coil. A superconductive material 142, which may be yttrium barium copper oxide is deposited into groove 140 on surfaces 132 and 135 and also into the segment of groove 140 extending along the internal aperture 136 from location 140A on surface 132 to location 140D on surface 135, and along the outer circumferential surface 134 of the disk from location 140B on surface 132 to location 140C on surface 135, to complete the coil.

To form either implementation of the superconductive coil depicted in FIGS. 3A, 3B and 3C or in FIGS. 7A, 78B and 7C, a material 142, which may be a high temperature superconductive (HTS) ceramic material that develops superconductive characteristics upon the application of heat is deposited into the grooves 140 in a "raw" state. By "raw" state is meant in the state before heat is applied to develop the superconductive characteristic. The entire assembly (the mold 130 with the HTS ceramic material 142 deposited in groove 140) is then placed in a conventional heat-treatment furnace (not shown) where both the ceramic form (mold) 130 and the HTS ceramic material 142 undergo the heat treatment that produces the superconductive effect in the HTS ceramic material. By using a ceramic material for the form (mold) that has a negative coefficient of thermal expansion, for example zirconium Tungstate ($ZrW_2O_8$), matched to the positive coefficient of thermal expansion of the HTS ceramic material (for example, yttrium barium copper oxide), the detrimental effect of thermal stress (the tendency for the HTS material to develop a different shape from the mold in which it is being formed, and to crack) can be substantially reduced.

Figure 8:
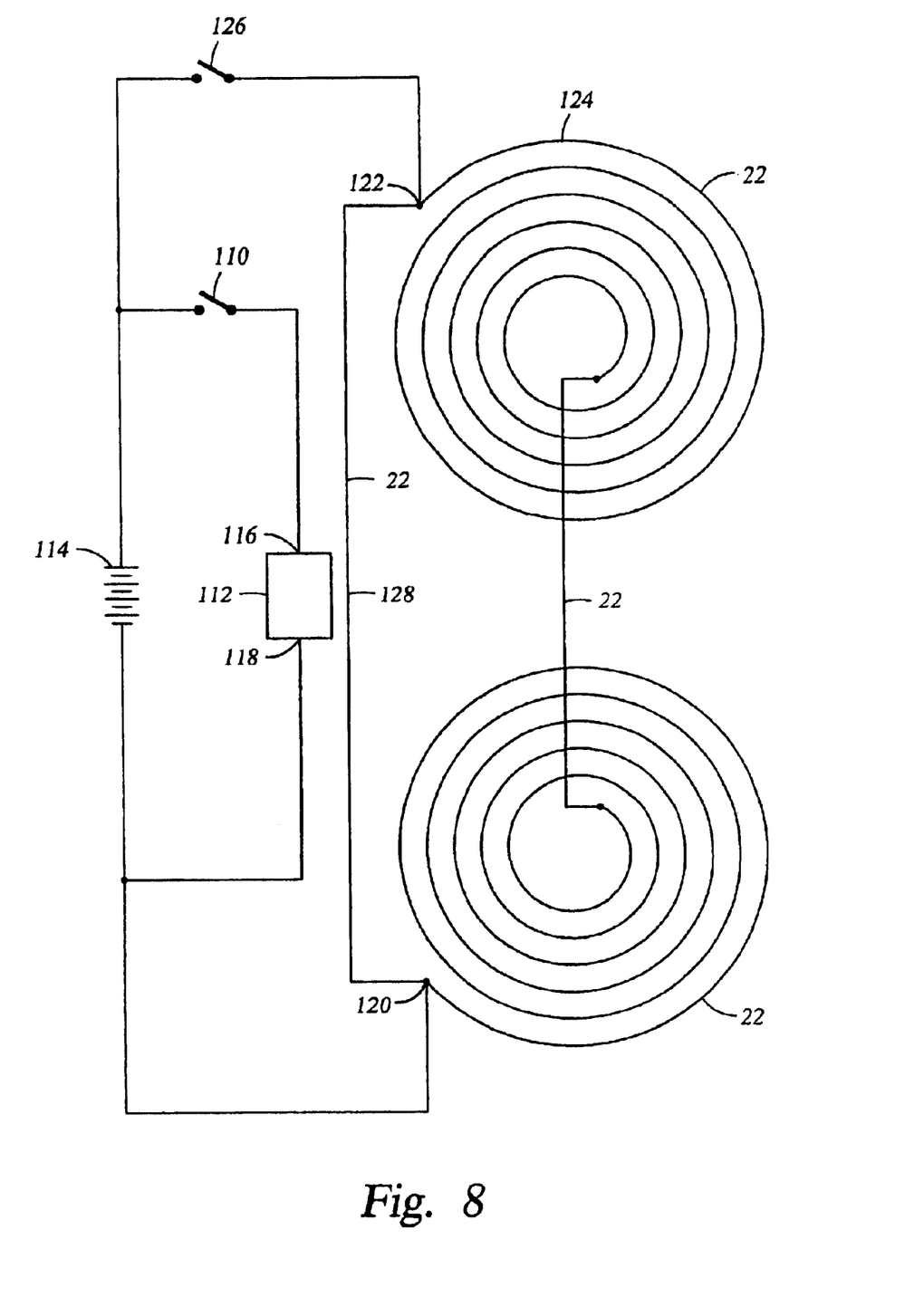
FIG. 8 shows a system for initiating current flow in a superconductive coil.

FIG. 8 illustrates a second embodiment of a circuit, referred to herein as a persistence switch, useful in initiating superconductive current flow in coil 22, the operation of which is explained more fully hereinafter.

The methods for fabricating a superconductive electrical conductor described with reference to FIGS. 3A, 3B and 3C and FIGS. 7A, 7B and 7C are equally applicable to the fabrication of superconductive electrical conductors for applications other than for implementing the generator described with reference to FIG. 1.

As shown more clearly in FIGS. 2A and 2B, in a preferred embodiment, prime mover 24 comprises a plurality of disks 23, which may be made from a high strength aluminum alloy. These disks are affixed together in axial alignment in spaced apart positions, in substantial parallel planes. In one implementation of the invention these disks are affixed together by bolt assemblies 62, which may comprise shoulder bolts. Bolt assemblies 62 may include spacers 64, as shown in FIG. 2A, between each of the disks 23. In a particular implementation of the invention, bolt assemblies 62 also affix the prime mover 24 to support disk 32. FIGS. 2A and 2B show four bolt assemblies 62, however, a different number of bolt assemblies may be utilized. The number of disks 23, the spacing between the disks and the dimensions of the disks may also vary, depending on the required power output, mechanical ruggedness and other design criteria which may be applicable to a particular implementation of the invention.

Rotational movement of prime mover 24 is generated by the flow of the gaseous nitrogen from conduit 30 through one or more high velocity nozzles 58 and through the space between the disks 23 of the prime mover 24. The gaseous stream will typically be projected by the nozzles in a direction which is substantially tangential to the edges of the disks 23. The nozzles may be machined into the wall of the housing structural member 50 within which the disks 23 prostate, rather than separate items connected to the end of conduit 30. The nozzles 58 may substantially increase the velocity of the gaseous nitrogen stream. The disks 23 are closely spaced apart so that the gaseous flow through the spaces between the disks 23 will drag the disks in the direction of the gaseous flow, and since prime mover 24 is mounted, via support disk 32, onto shaft 38, rotational motion of the disks 23 included in the prime mover is generated. Rotational speed of the prime mover assembly increases until the surface speed of the outside edge of the disks 23 reaches almost the same velocity as that of the gaseous jet emanating from the nozzles 58. To increase the power produced by this prime mover assembly, the number of disks 23 and nozzles 58 may be increased, and the volume of nitrogen flow may be increased accordingly. The gas flow across the surface of the disks 23 drags the disk surfaces along the direction of the gas flow. This action takes place in a "layer" of the gas next to the disk surface. It has been called the "boundary" between the gas and the geometrical surface, hence "boundary layer" effect.

Although a preferred embodiment of the invention has been described in terms of a prime mover comprising a plurality of closely spaced, parallel, coaxially mounted disks, those of ordinary skill in the art will recognize that a bladed turbine may also be utilized in implementing the invention, as well as other more conventional prime movers which operate on gas expansion.

The rotational motion of prime mover 24 is transferred to the Faraday disk 44 through shaft 38. Shaft 38 comprises a bolt-like unit, which may be secured to support disk 32 by nut unit 36 in a conventional nut and threaded shaft configuration Shaft 38 and nut unit 36 may each be made from stainless steel, copper or other material having similar qualities of strength and ruggedness. Nut 36 may be shaped to facilitate flow of gas from the prime mover through exhaust port 56. Shaft 38 may be fixedly connected to Faraday disk 44 by brazing, or by a threaded connection or other means known to those of ordinary skill in the art. Shaft 38 and Faraday disk 44 may also be machined as a unitary structure. Bearing 42 is positioned between shaft 38 and housing structural member 50, to maintain the shaft in alignment and to permit rotational movement of the shaft 38 in sliding engagement with bearing 42. In a particular embodiment bearing 42 may also be configured to extend into the space between support disk 32 and structural member 50, so provide clearance so that support disk 32 can rotate freely. In a preferred embodiment, bearing 42 is made from electrically conductive material in order to conduct electrical current which flows through shaft 38 from the center of the Faraday disk. Bearing 42 may be formed from graph alloy, or other material having similar qualities of low thermal expansion, high electrical conductivity and low surface friction.

Faraday disk 44 is mounted in sliding engagement within bearing 46. In a preferred embodiment, bearing 46 is made from electrically conductive material in order to conduct current into (or from) the outer edge of the Faraday disk. Bearing 46 may be formed from graph alloy, or other material having similar qualities of low thermal expansion, high electrical conductivity and low surface friction. In a preferred embodiment, bearings 42 and 46 provide a means for transmitting electrical energy from the Faraday disk to an external electrical load, as well as a suitable low friction bearing for the shaft 38 and the Faraday disk 44.

Figure 4:
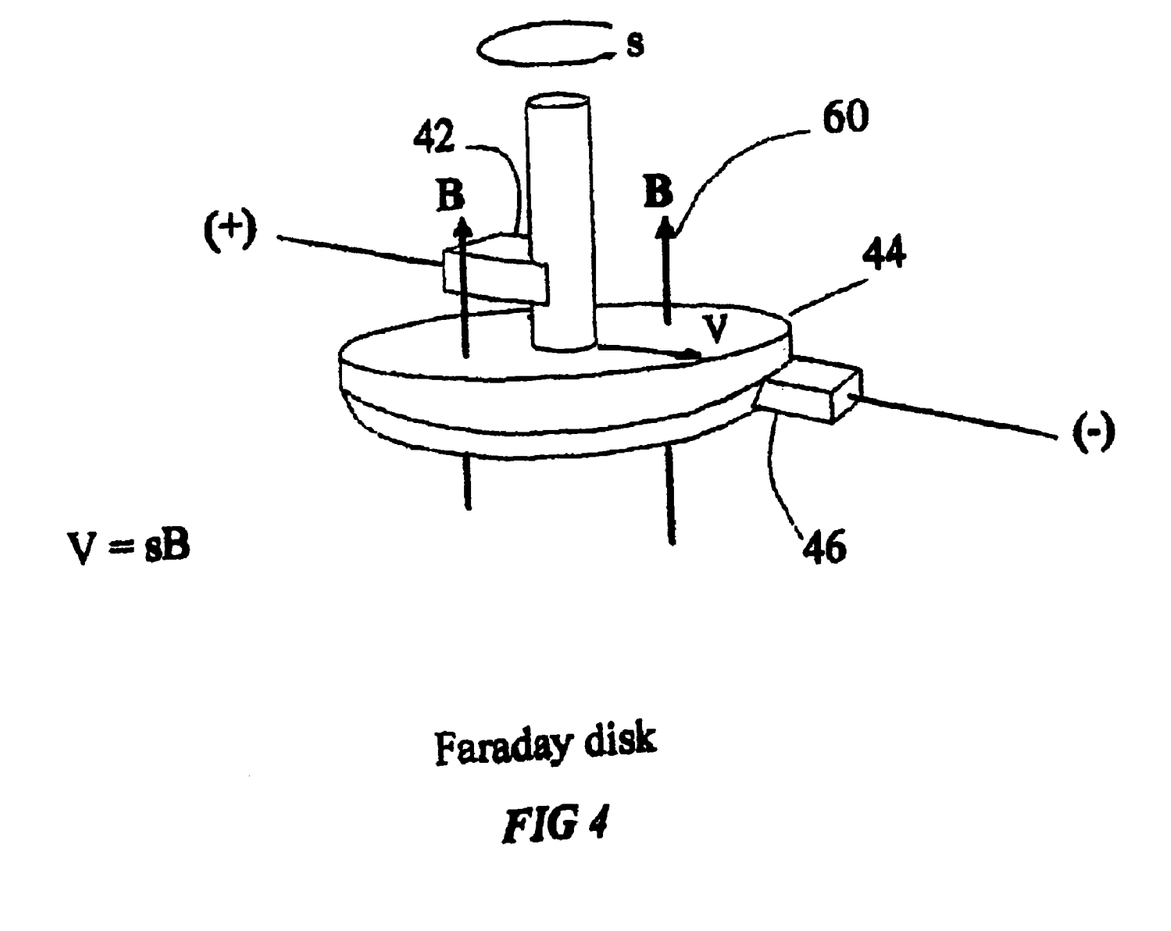
FIG. 4 illustrates in schematic form the generation of a current in a Faraday disk.

As shown schematically in FIG. 4, Faraday disk 44, which may be made from copper or other highly conductive material rotates through the magnetic flux lines 60 resulting from current flow in coil 22. In accordance with a preferred embodiment of the present invention, an intense magnetic field is produced through the use of the superconducting coil. Induction occurs as a magnetic field is changing strength. In accordance with a preferred embodiment of the invention, the rotating portion of electric power generator 10 moves in relation to the stationary magnetic field and hence produces an electrical current. FIG. 4 illustrates in schematic form the generation of a current in a Faraday disk. The magnetic lines of flux denoted by the letter "B", are shown flowing through the Faraday disk, which is indicated to be rotating in a counterclockwise direction. This rotational movement of the Faraday disk generates an electrical voltage, V, between the center point of the disk, and its outer edge. By positioning a first electrode in contact with the center point of the disk and a second electrode at the outer edge of the disk, a current flow is generated. In the embodiment shown in FIG. 1, bearing 42 is the first electrode and bearing 46 is the second electrode.

It is well known to those of ordinary skill in the art that the power that may be produced by a Faraday disk is governed by the following formulas:

$$V = sB \tag{Eq. 1}$$

where: V=voltage developed across the Faraday disk
s=rotational speed of disk in revolutions per second, and
B=magnetic flux in Teslas.

$$I = \frac{V}{r} \tag{Eq. 2}$$

where:
I=current in amperes
V=voltage developed across the Faraday disk
r=resistance of external load in ohms $$\text{and: } W = IV \tag{Eq. 3}$$

where W=output power in watts
I=current in amperes
V=voltage developed across the Faraday disk.

Although a preferred embodiment of the invention has been described in terms of using a Faraday disk for generation of electrical power, those of ordinary skill in the art will understand that other electrical conductor configurations may be utilized. For example, an electrically conducting coil configuration typical of the electrical conducting coils normally used in electrical power generation system could be rotated in the magnetic field generated by the superconducting coil for generating output power.

With reference to FIGS. 3A, 3B and 3C, electrical power generator 10 may be powered up as follows. Once the cryogenic container 12 has been filled with liquid nitrogen and level sensor 40 has closed cryogenic valve 48 and stopped the flow of liquid nitrogen into the cryogenic container 12, electrical energy is supplied to coil 22. As stated above in the discussion with respect to FIG. 3C, this electrical energy may be supplied from a battery (not shown) which is connected between terminals 84 and 86. The voltage and current capacity of the battery is selected in accordance with the desired current flow into superconducting coil 22. Typically, the battery will be connected to terminals 84 and 86 by means of electrically conducting wires which will pass through a conduit (not shown) in cryogenic container 12.

As previously stated, resistance heater 82 is connected between terminals 84 and 86, and when a battery is connected across terminals 84 and 86, current will flow through coil 22 and through resistance heater 82. Resistance heater 82 is positioned in juxtaposition to connective link 80, and will maintain connective link 80 at a temperature above its superconductive temperature. Normally, as current begins to flow from the battery through the superconductive coil 22 and back to the battery, the temperature of the coil 22 will be above its critical (i.e., superconductive) temperature. When the coil 22, which is immersed in liquid nitrogen, reaches a temperature below its superconductive temperature, the coil becomes superconductive, and the voltage across terminals 84 and 86 will drop to substantially zero, and the electrical power to the resistance heater is thereby substantially removed. The connective link 80 will then cool to a temperature below its critical temperature and connective link 80 will become superconductive. A superconductive coil has now been formed, with a flow path connecting the beginning of the coil at location 76 to the end of the coil at location 78. The battery may now be disconnected, and the electrical current will continue to flow in coil 22 without any additional current needed from the battery as long as the coil is kept at or below the critical (superconducting) temperature of the material form which the coil is formed.

With reference to FIGS. 7A, 7B, 7C and 8, in an alternate embodiment, electrical power generator 10 may be powered up as follows. Once the cryogenic container 12 has been filled with liquid nitrogen and level sensor 40 has closed cryogenic valve 48 and stopped the flow of liquid nitrogen into the cryogenic container, switch 110 is closed, and an electrical source 114, which may be a battery, is connected across terminals 116 and 118 of resistor 112, and an electrical current is caused to flow through resistive heater 112. Resistive heater 112 is placed in proximity to a segment of coil 22, shown in FIG. 8 as segment 128. As coil 22 is cooled by the cryogenic fluid, the segment 128 of coil 22 adjacent heater 112 is maintained above the superconductive temperature of the coil. As segment 124 of coil 22 (the portion of superconductive coil 22 that is not heated by heater element 112) cools below the superconductive temperature, switch 110 is opened, removing the current flow through resistor 112, and switch 126 is closed, thereby applying electrical source 114 across terminals 122 and 120 and initiating current flow from current source 114 through segment 124 of coil 22. Although the electrical source 114 is also applied across coil segment 128, initially the current flow through coil segment 128 will be limited because the heat front resistive heater 112 will maintain segment 128 above its superconductive temperature. However, as segment 128 cools and becomes superconductive, the current will begin to flow from coil segment 124 through segment 128, thereby establishing a superconductive current loop throughout superconductive coil 22. Switch 126 may then be opened (or the battery 14 may be removed) and the current will continue to flow through superconductive coil 22.

As the liquid nitrogen in cryogenic container 12 absorbs heat, the liquid nitrogen is continually boiled off to produce gaseous nitrogen. The process of absorption of heat energy from the environment is a process that depends on the difference in temperature between the environment and the liquid nitrogen and the quality of heat conductive paths between the environment and the liquid nitrogen. Heat flows toward the lowest temperature. Hence, the heat from the earth will by nature flow toward the liquid nitrogen and boil the nitrogen, and then continue to heat the gaseous nitrogen until the gaseous nitrogen reaches the ambient temperature on the earth at the location of the generator. The thermal design of electrical power generator 10 will control the rate at which heat flows to the liquid nitrogen. Accordingly, the thermal capabilities of the generator may be designed to accommodate the heat flow required to provide the power desired from the machine.

Electrical insulating barrier 13 is fabricated from electrically non-conducting material in order to form an electrical barrier between the cryogenic barrier 18 and element 50. Electrical insulating barrier 13 also functions as a structural element to secure structural element 50 and graphalloy bearing 42 in position. Element 50 is formed of an electrically conducting material, such as stainless steel or copper, and is electrically connected through the graph alloy bearing 42 and shaft 38 to the center of Faraday disk 44. Cryogenic barrier 18; is connected through graphalloy bearing 46 to the outer edge of Faraday disk 44. Electrical insulating element 13 provides electrical insulation between cryogenic barrier 18 and element 50. Current developed by the Faraday disk is conveyed from the center of the Faraday disk, through shaft 38, graphalloy bearing 42, structural element 50 and through a first electrical conductor (not shown) to an external electrical power user. The return current path is through a second electrical conductor (not shown), cryogenic barrier 18 and graphalloy bearing 46 to the outer edge of Faraday disk 44. Element 50 also provides a housing for the prime mover. Element 52 closes the housing and provides an exhaust port for the spent gaseous nitrogen.

The upper portions of the machine, comprising cryogenic barrier 18, electrical insulating barrier 13, structural member 50, and exhaust cover 52 may also function as heat exchangers in addition to providing the mechanical structure of the machine. In addition, in one embodiment of the invention sufficient resistivity may be built into cryogenic barrier 18 so that as the power output demand from the generator increases and the current flow through cryogenic barrier 18 increases, the heat generated in cryogenic barrier 18 will increase accordingly, thereby providing a proportionate increase in the rate of conversion of the liquid nitrogen to gaseous nitrogen for driving the prime mover. If it is anticipated that a generator may be required to provide power over wide power output range, additional heat exchangers may be included as a part of the generator.

Figure 5:
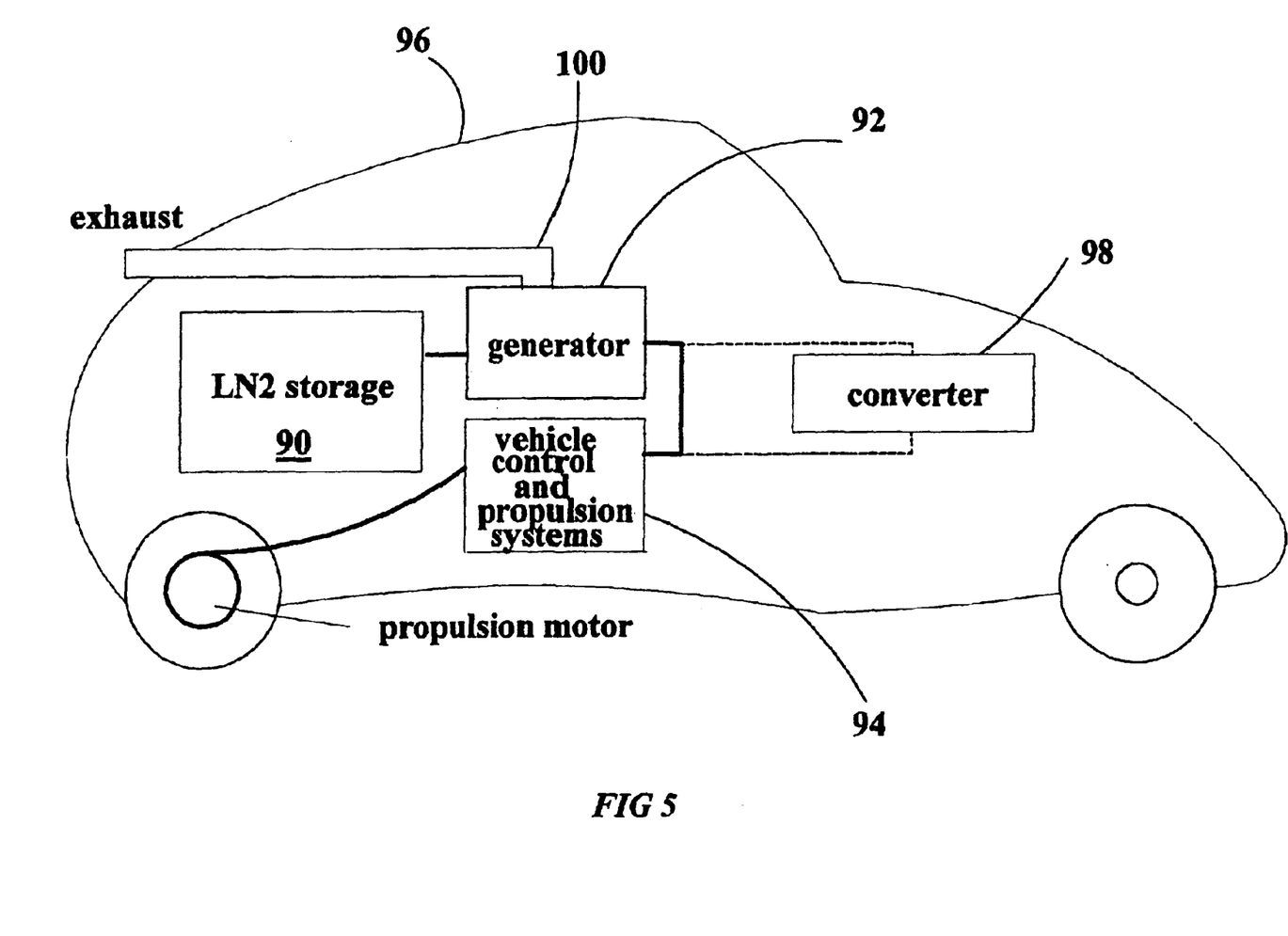
FIG. 5 illustrates the application of the invention to the operation of an automobile.
Figure 6:
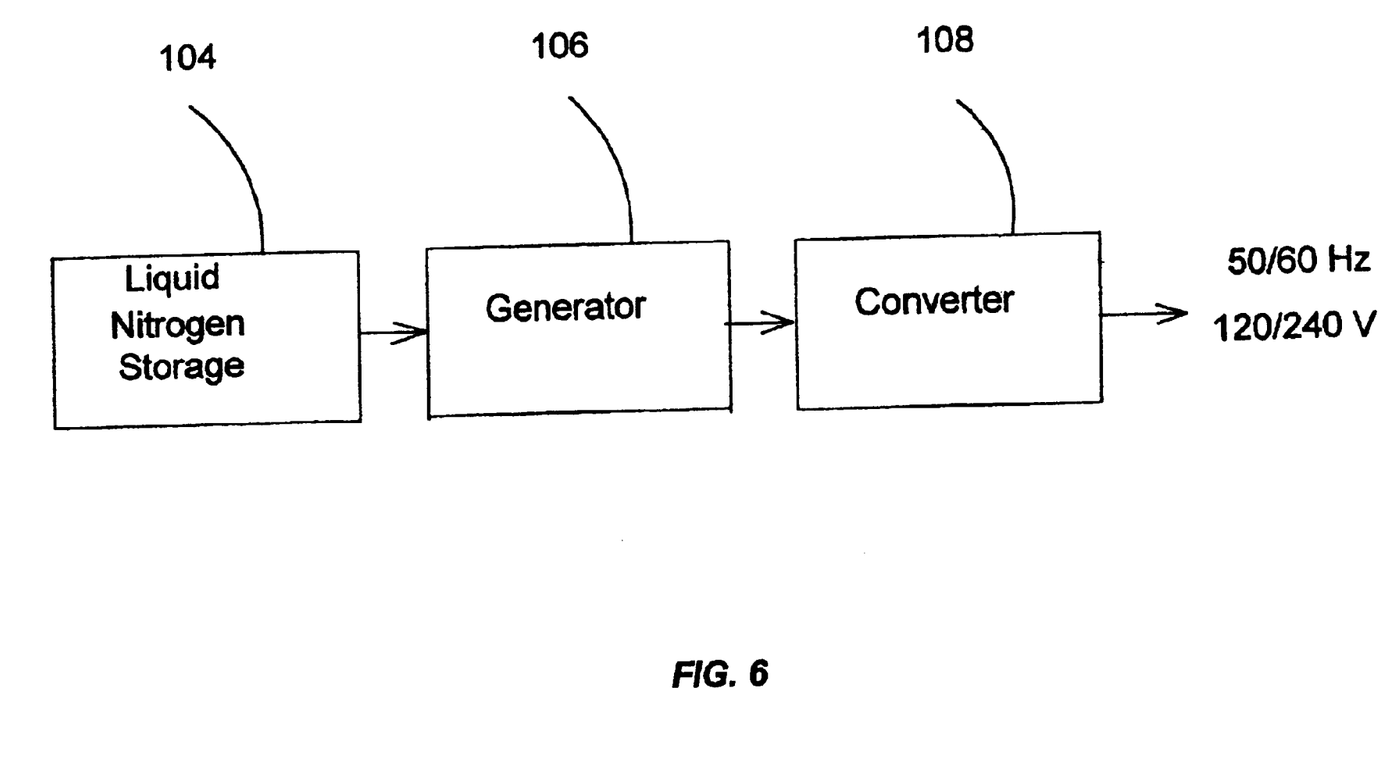
FIG. 6 illustrates the application of the invention for supplying electrical power to a residence.

Uses for the invention may include but are not limited to supplying power for operating an automobile and supplying power to operate the electrical appliances and equipment found in a personal residence. FIG. 5 illustrates the use of the invention for supplying power to an automobile 96. A liquid nitrogen storage unit, designated by numeral 90, supplies liquid nitrogen to the generator 92, which is substantially similar to generator 10 described with reference to FIG. 1. Gaseous liquid nitrogen is exhausted through conduit 100. The output of the generator 92 supplies the power to the vehicle control and propulsion system 94, which may be similar to the control and propulsion system utilized in prior art electrically powered automobiles. Depending on the output voltage level from generator 92, the generator may optionally be applied to a converter 98, to convert the output of the generator to the appropriate voltage level for operating the automobile. Such converters are well known to those of ordinary skill in the art and will not be described in detail herein FIG. 6 illustrates the use of the invention for supplying power to a residence. As shown in FIG. 6, liquid nitrogen is supplied from liquid nitrogen storage unit 104 to the generator 106, whose construction is substantially similar to generator 10 described with reference to FIG. 1. The output of generator 106 is supplied to converter 108, which converts the output from generator 106 to the frequency and voltage required for running a residential electrical system, which typically is 120 or 240 volts, at 50 or 60 Hz. frequency. Such converters are well known to those of ordinary skill in the art and will not be described in detail herein.

It will be appreciated that various modifications, alternatives, variations, and changes may be made without departing from the scope of the invention as defined in the appended claims. It is intended to cover by the appended claims all such modifications involved within the scope of the claims.

I claim:

1. A method for manufacturing a superconductive electrical conductor, comprising forming a channel in a mold formed from a ceramic material having a negative heat coefficient of expansion; and depositing in said channel a material that develops superconductivity characteristics upon the application of heat, said deposited material having a positive heat coefficient of expansion; and applying heat to said mold having channels with said material deposited therein to develop said superconductivity characteristic in said deposited material.

2. The method of claim 1 wherein said negative heat coefficient of expansion and said positive heat coefficient of expansion are complementary, such that change with heat in dimensions of the channel formed in said mold and change with heat in dimensions of said material deposited in said channel are substantially the same.

3. The method of claim 1 wherein said channel forms a coil.

4. The method of claim 1 wherein said mold comprises a first surface and a second surface and said channel extends in a substantially spiral pattern on said first surface and in a substantially spiral pattern on said second surface; and wherein said channel extends between the substantially spiral pattern on said first surface and said substantially spiral pattern on said second surface to form a continuous coil said continuous coil including the substantially spiral pattern on said first surface and the substantially spiral pattern on said second surface.

5. The method of claim 1 wherein said mold comprises a first surface and a second surface and an outer circumferential surface extending from said first surface to said second surface and an inner aperture extending from said first surface to said second surface; and wherein said channel extends in substantially a spiral pattern in a first direction on said first surface from a first location at said inner surface to a second location at said outer circumferential surface, and wherein said channel extends in substantially a spiral pattern in a second direction on said second surface from a third location at said inner surface to a fourth location at said outer circumferential surface, and said channel extending along said inner aperture from said first location to said second location and along said outer circumferential surface from said third location to said fourth location.

6. The method of claim 1 wherein said mold comprises a first surface and a second surface and an outer circumferential surface extending from said first surface to said second surface and an inner surface extending from said first surface to said second surface and defining an aperture in said mold; and wherein said channel extends in a substantially spiral pattern on said circumferential surface from a first location at said first surface to a second location at said second surface, and wherein said channel extends along said second surface from said second location to a third location at said inner surface and along said inner surface from said third location to a fourth location at said second surface and along said second surface from said fourth location to said first location.

7. The method of claim 1 wherein said material that develops superconductivity characteristics is yttrium barium copper oxide.

8. The method of claim 1 wherein said ceramic having a negative heat coefficient of expansion is zirconium tungstate ($ZrW_2O_8$).

9. A superconductive electrical conductor, comprising
a mold formed from a ceramic material having a negative heat coefficient of expansion and having a channel formed therein; and
a superconductive material deposited in said channel, said superconductive material developing superconductive characteristics upon the application of heat and having a positive heat coefficient of expansion.

10. The apparatus of claim 9 wherein said negative heat coefficient of expansion and said positive heat coefficient of expansion are complementary, such that change with heat in dimensions of the channel formed in said mold and change with heat in dimensions of said material deposited in said channel are substantially the same.

11. The apparatus of claim 9 wherein said channel forms a coil.

12. The apparatus of claim 9 wherein said mold comprises a first surface and a second surface and said channel extends in a substantially spiral pattern on said first surface and in a substantially spiral pattern on said second surface; and
wherein said channel extends between the substantially spiral pattern on said first surface and said substantially spiral pattern on said second surface to form a continuous coil said continuous coil including the substantially spiral pattern on said first surface and the substantially spiral pattern on said second surface.

13. The apparatus of claim 9 wherein said mold comprises a first surface and a second surface and an outer circumferential surface extending from said first surface to said second surface and an inner surface extending from said first surface to said second surface and defining an aperture in said mold; and
wherein said channel extends in substantially a spiral pattern in a first direction on said first surface from a first location at said inner surface to a second location at said outer circumferential surface, and wherein said channel extends in substantially a spiral pattern in a second direction on said second surface from a third location at said inner surface to a fourth location at said outer circumferential surface, and said channel extending along said inner surface from said first location to said second location and along said outer circumferential surface from said third location to said fourth location.

14. The apparatus of claim 9 wherein said mold comprises a first surface and a second surface and an outer circumferential surface extending from said first surface to said second surface and an inner surface extending from said first surface to said second surface and defining an aperture in said mold; and
wherein said channel extends in a substantially spiral pattern on said circumferential surface from a first location at said first surface to a second location at said second surface, and wherein said channel extends along said second surface from said second location to a third location at said inner surface and along said inner surface from said third location to a fourth location at said second surface and along said second surface from said fourth location to said first location.

15. The apparatus of claim 9 wherein said material that develops superconductivity characteristics is yttrium barium copper oxide.

16. The apparatus of claim 9 wherein said ceramic having a negative heat coefficient of expansion is zirconium tungstate ($ZrW_2O_8$).

17. A superconductive coil comprising a disk formed from ceramic material having a first surface and a second surface and an outer circumferential surface extending from said first surface to said second surface and an inner aperture extending from said first surface to said second surface;
said disk having a channel extending in substantially a spiral pattern in a first direction on said first surface from a first location at said inner aperture to a second location at said outer circumferential surface, and extending in substantially a spiral pattern in a second direction on said second surface from a third location at said inner aperture to a fourth location at said outer circumferential surface, and extending along said inner aperture from said first location to said third location and along said outer circumferential surface from said second location to said fourth location; and
a superconductive material deposited in said channel forming a superconductive coil.

18. A superconductive coil comprising a mold having a first surface and a second surface and an outer circumferential surface extending from said first surface to said second surface and an inner surface extending from said first surface to said second surface and defining an aperture in said mold;
a channel extending in a substantially spiral pattern on said circumferential surface from a first location at said first surface to a second location at said second surface, and extending along said second surface from said second location to a third location at said inner surface and along said inner surface from said third location to a fourth location at said second surface and along said first surface from said fourth location to said first location; and
a superconductive material deposited in said channel forming a superconductive coil.

19. A method for manufacturing an electrically superconductive coil comprising:
forming a substantially spiral channel in a mold having a top side and a bottom side, said spiral channel extending from a first location at a top side of said mold to a second location at the bottom side of said mold;
forming a connective channel between said first location and said second location; and
depositing a material in said spiral channel and in said connective channel; said material being superconductive at temperatures below a critical temperature.

20. The method of claim 19 wherein said material deposited in said spiral channel is yttrium barium copper oxide.

21. The method of claim 19 wherein said ceramic mold is formed from zirconium tungstate ($ZrW_2O_8$).

22. An electrically superconductive coil, comprising:
a mold having a spiral channel formed therein, said spiral channel extending from a first location at a top side of said mold to a second location at the bottom side of said mold, and having a connective channel formed in said mold between said first location and said second location; and
a material deposited in said spiral channel and in said connective channel; said material being superconductive at temperatures below a critical temperature.

23. The apparatus of claim 22 wherein said material deposited in said spiral channel is yttrium barium copper oxide.

24. The apparatus of claim 22 wherein said mold is formed from zirconium tungstate ($ZrW_2O_8$).

25. A method for manufacturing an electrically superconductive coil, comprising: forming a channel in a disk formed from ceramic material having a first surface, a second surface, an outer circumference and an aperture extending through said disk, said channel extending in substantially a spiral pattern in a first direction on said first surface from a first location at said aperture to a second location at said outer circumference, and extending in substantially a spiral pattern in a second direction on said second surface from a third location at said aperture to a fourth location at said outer circumference, and extending from said first location to said third location and from said second location to said fourth location; and depositing a superconductive material deposited in said channel, thereby forming a superconductive coil.

26. The method of claim 25 wherein said material deposited in said channel is yttrium barium copper oxide.

27. The method of claim 25 wherein said disk is formed from zirconium tungstate ($ZrW_2O_8$).

28. A superconductive coil comprising a disk formed from ceramic material having a first surface, a second surface, an outer circumference and an aperture extending through said disk, said disk having a channel extending in substantially a spiral pattern in a first direction on said first surface from a first location at said aperture to a second location at said outer circumference, and extending in substantially a spiral pattern in a second direction on said second surface from a third location at said aperture to a fourth location at said outer circumference, and extending from said first location to said third location and from said second location to said fourth location; and a superconductive material deposited in said channel forming a superconductive coil.

29. The apparatus of claim 28 wherein said material deposited in said channel is yttrium barium copper oxide.

30. The apparatus of claim 28 wherein said disk is formed from zirconium tungstate ($ZrW_2O_8$).

* * * * *